May 4, 1948.　　　　　　G. MASROB　　　　　　2,441,027
POTATO SLICER INCLUDING STATIONARY HORIZONTAL AND
VERTICAL KNIVES AND A RECIPROCATING CARRIAGE
Filed Sept. 12, 1946　　　　2 Sheets-Sheet 1
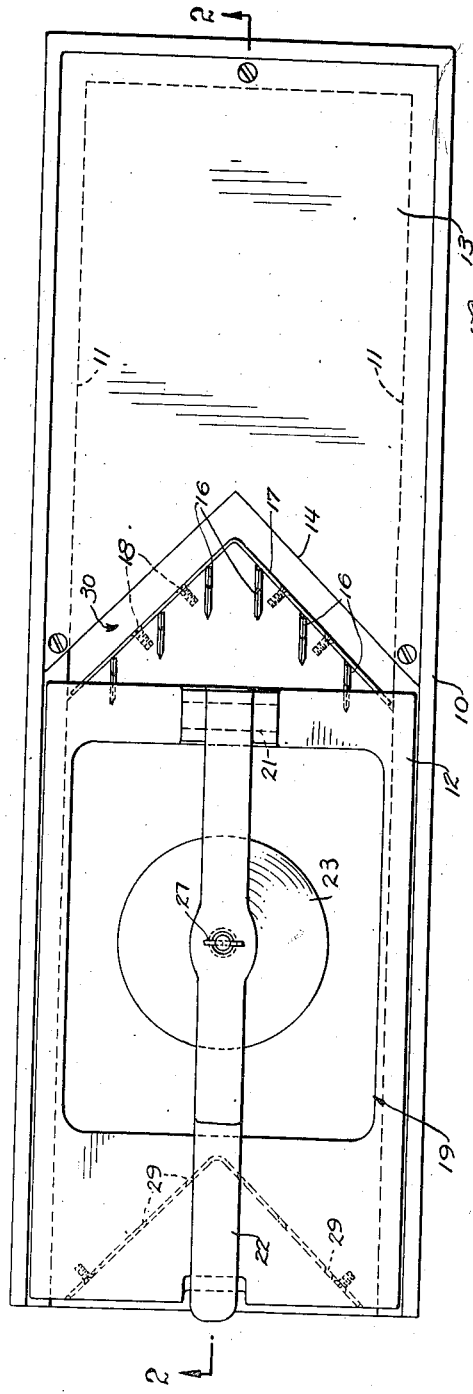
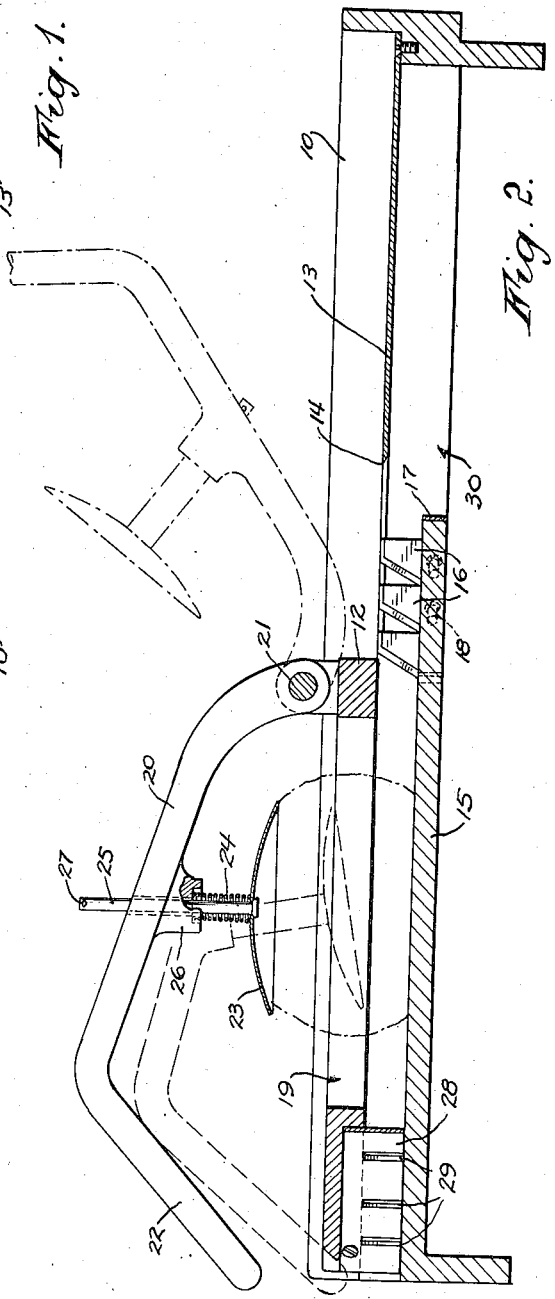
INVENTOR.
George Masrob.
BY
Stanley Lightfoot.
ATTORNEY May 4, 1948.  G. MASROB  2,441,027
POTATO SLICER INCLUDING STATIONARY HORIZONTAL AND
VERTICAL KNIVES AND A RECIPROCATING CARRIAGE
Filed Sept. 12, 1946   2 Sheets-Sheet 2
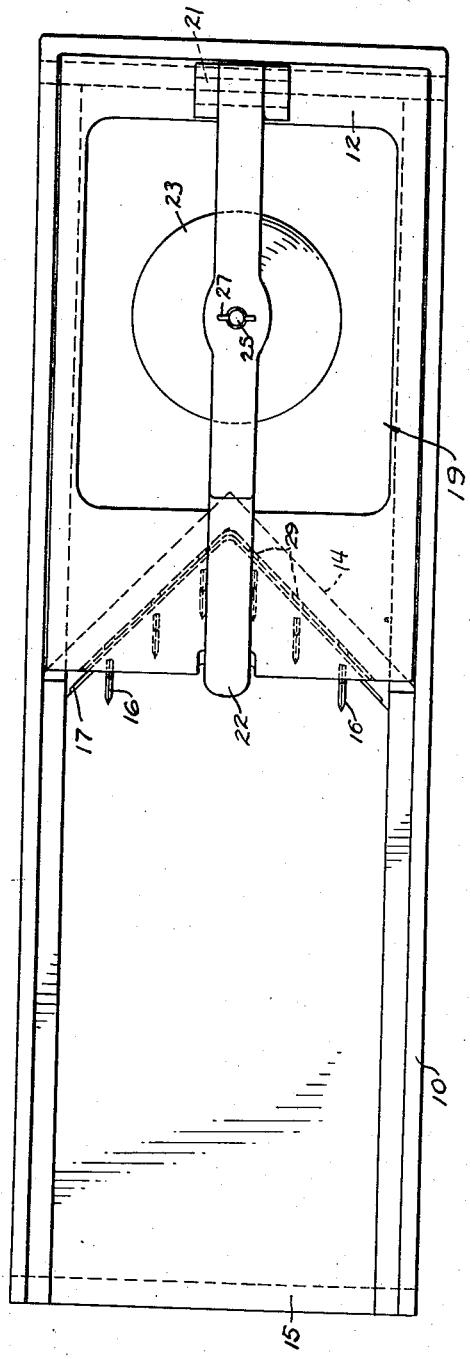
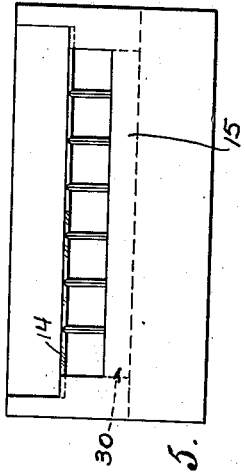
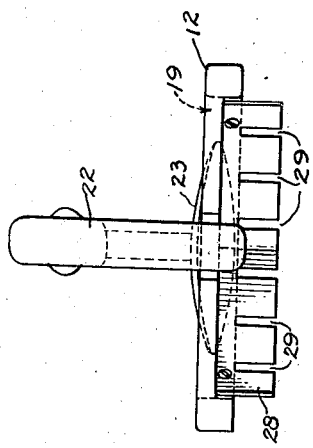
INVENTOR.
George Masrob.
BY
Stanley Lightfoot
ATTORNEY Patented May 4, 1948

2,441,027

UNITED STATES PATENT OFFICE 2,441,027

POTATO SLICER, INCLUDING STATIONARY HORIZONTAL AND VERTICAL KNIVES AND A RECIPROCATING CARRIAGE

George Masrob, Detroit, Mich.

Application September 12, 1946, Serial No. 696,437

1 Claim. (Cl. 146—169)

This invention relates to a device for the slicing of potatoes and similar vegetables and has for its object to provide simple hand-operated means for that purpose suitable for general kitchen use, capable of economic manufacture, ready assembly and disassembly, and admitting of easy cleansing or sterilizing.

More particularly, the said invention proposes to provide in such a device a simple stationary part in the form of a slideway provided with cutting knives and a hand-operated slide provided with means for urging a potato or similar article between the knives for the vertical slicing thereof and against a horizontal blade for the horizontal slicing to produce the well-known sliced article generally referred to as "chips."

A further object is to provide means for correctly maintaining the potato in position in the slide during the slicing operation; a further object being to provide for the application of pressure to the upper portion of the potato during such operation.

A still further object is to provide a series of cutting blades arranged in the form of a V pocket, having a centering effect on the potato as it enters the blades and distributing the cutting pressure on either side of a line through the medial portion of the potato; a further object being to provide a correspondingly V-shaped ejector plate suitably slotted to pass between the cutting blades and ensure the complete ejection of the cut "chips" therefrom.

A still further object is to provide the slide of the device with an opening for receiving a potato to be cut and a hinged handle extending over said opening for the operation of said slide, said handle being swingable to a position to permit the free unobstructed placement of a potato in the said opening; a further object being to provide the said handle with means for resiliently engaging the upper portion of a potato so positioned whereby the desired amount of pressure may be exerted thereon when the cutting operation is performed through the agency of the said handle.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may provide the novel construction and arrangement of parts hereinafter further described, by way of example, having reference to the accompanying drawings, wherein:

Figure 1 is a plan of a potato slicer embodying the said invention, the slide being shown in its retracted or preslicing position;

Figure 2 is a vertical longitudinal sectional view of the same taken on a plane indicated by the line 2—2 in Figure 1;

Figure 3 is a similar view to Figure 1 showing the slide in the advanced position which it occupies upon the completion of a slicing operation;

Figure 4 is an end elevation of the slide removed; and

Figure 5 is an end elevation of the base structure or slideway with the slide removed.

Similar characters of reference indicate similar parts in the several figures of the drawings.

10 is the base structure or slideway of the device, 11 being the longitudinal rails or tracks upon which the slide 12 is horizontally reciprocal. Spanning the rearward portion of the said rails 11 is a horizontal cutting blade 13, the forward cutting edge 14 of which is of a V formation as clearly shown in Figure 1 of the drawings.

Extending throughout the forward portion of the base or slideway 10 is a base plate 15 terminating somewhat short of the front edge of the cutter blade 13 and lying on a plane below that of the said base cutter blade, the forward end of the said base plate 15 being also bevelled to a V formation in counter-part of that of the cutting edge of the said blade 13 and having mounted along the aforesaid forward end a series of upstanding blades 16. These blades 16 I prefer to drive into suitable slots in the forward end of the said base plate 15 and secure in position by means of a V-shaped end plate 17 which may be held in position by screws 18 as shown. By suitably tightening the said plate over the bevelled end of the base plate 15, as by means of the said screws 18, the slot portions thereof may be tightly closed about the inserted blades as an additional means of securing them in position. It is preferred that the forward cutting edges of the said blades 16 be inclined to the vertical, as shown in Figure 2, to enhance their cutting action. The height of the blades is such, of course, that they will not interfere with the sliding of the member 12 thereover in the operation of the device.

The said slide 12 is provided with an opening 19 into which a potato or similar article to be sliced may be inserted so that it will rest upon the upper surface of the base plate 15; and I show the said slide as being provided with an operating handle 20 hingedly mounted at 21 and having its forward end bent downwardly at 22 to provide a suitably positioned hand grip, the said handle carrying therebeneath a vertically movable plate 23, downwardly biassed by a spring 24, the said plate being shown in this example as being provided with an upwardly extending stem 25 slidably passing through a boss 26 in the handle and provided with a stop 27 at its upper end to prevent its complete detachment from the said handle. This plate is intended to apply a desired amount of pressure to the top of the potato during a slicing operation to maintain it in contact with the base plate, and the said plate 23 is also of a suitable formation adapted to prevent undesired rolling of the potato when the slide is operated. The spring 24 also permits the said plate to accommodate itself to potatoes of different shapes and sizes.

Depending below the rear end of the slide, and closely approaching the upper surface of the base plate 15, is a V-shaped ejector plate 28, slotted at 29 in longitudinal alignment with the several blades 16, and so positioned that when the slide 12 is moved by the operator to the position shown in Figure 3 the said ejector plate will pass beyond the plate and so eject the portions of the potato sliced therefrom by the combined action of the blades 16 and plate 13 through the opening 30 provided in the base of the device for that purpose, whereby the "chips" so produced may fall into any suitable container over which the device may be positioned during a slicing operation.

As clearly shown in Figure 2, the hinged handle 20 may be swung out of position to permit of the easy and unobstructed placing of potatoes or other articles in the slide; and the hinged nature of the handle also permits the regulation of pressure upon the potato being governed to some extent as may be desirable for the most effective operation of the device, as will be obvious.

The V shape and disposition of the cutting edge of the blade 13, of the blades 16, and of the ejector plate 28 provide for a cutting action and the distribution of forces which ensures highly efficient and easy slicing of the potatoes in the manner desired, so that the device may be operated even over a considerable period of time with a minimum of exertion and with the assurance that the potatoes will at all times be properly presented to the cutting blades for the securing of uniformity.

This invention may be developed within the scope of the following claim without departing from the essential features of the said invention, and it is desired that the specification and drawing be read as being merely illustrative of a practical embodiment of the same and not in a strictly limiting sense.

What I claim is:

In a device of the class described, a base plate having a series of upstanding slicer blades arranged in V formation at one end, a horizontal cutter plate beyond said blades and at a height substantially that of said blades, a slide having a receiving opening therein, means for guiding said slide for reciprocal motion over said blades and said cutter plate, and an ejector plate depending from said slide, said plate being slotted and positioned to pass through the spacing of said blades when said slide is moved over said cutter plate, means for effecting reciprocal movement of said slide, an upwardly swingable slide-operating handle extending over said slide, and yieldable means carried by said handle for engaging the upper portion of an article inserted in the opening of said slide.

GEORGE MASROB.

REFERENCES CITED

The following references are of record in the file of this patent:

UNITED STATES PATENTS

| Number | Name | Date |
|---|---|---|
| 574,971 | Whyte | Jan. 12, 1897 |
| 653,385 | Howell et al. | July 10, 1900 |
| 940,830 | Spenko | Nov. 23, 1909 |
| 2,140,075 | Farabough | Dec. 13, 1938 |

FOREIGN PATENTS

| Number | Country | Date |
|---|---|---|
| 39,292 | Austria | Oct. 11, 1909 |